Patented Jan. 13, 1948

2,434,281

UNITED STATES PATENT OFFICE 2,434,281

GLASS AND METHOD OF MAKING SAME

Harold R. Moulton, Southbridge, Mass., assignor to American Optical Company, Southbridge, Mass., a voluntary association of Massachusetts No Drawing. Application May 15, 1942, Serial No. 443,172

5 Claims. (Cl. 106—47)

This invention relates to improvements in glass compositions and glasses resulting from said compositions and has particular reference to novel means of obtaining a substantially completely chemically reacted glass batch substantially free from by-products and impurities and method of making the same.

One of the principal objects of the invention is to provide a fused homogeneous mass of glass resulting from the fusion joining of previously chemically reacted ingredients with substantially no chemical reaction taking place during said fusing.

Another object of the invention is to provide a glass and method of making the same whereby the essential components from which the glass is formed undergo a substantially complete chemical reaction prior to making a melt of said glass.

Another object is to provide novel means of forming a glass by bringing about a chemical reaction of several of the components from which the glass is to be formed and to which other ingredients may be added either during the chemical reaction or during the actual melting.

Another object is to so control the mixture of the compounds prior to the chemical reaction thereof whereby the resultant ingredients desired in the melt will be of proper proportions and will be substantially free of undesired by-products.

Another object is to provide a novel method of forming glass which will be substantially free of undesirable by-products and which can be melted to a homogeneous glass at lower temperatures than those ordinarily required in forming such melts.

Another object is to provide novel means and method of forming a glass batch whereby the batch is so intimately mixed before introduction into the melting container that any corrosive ingredients which might be present will not have an opportunity to attack the walls of the container.

Another object is to provide a novel method of fabricating glass whereby substantially all the volatile compounds are driven off prior to the melting operation.

Another object is to provide a novel method of forming glass compositions embodying ingredients which under ordinary conditions of melting would tend to segregate from the liquid portion of the mix either by floating or settling, whereby said ingredients will be uniformly dispersed and combined with the initial glass formers of the mix, with the melting taking place uniformly and homogeneously.

Another object is to chemically combine the ingredients which with ordinary mechanical mixing would introduce difficulties in forming said melts whereby said ingredients will be combined in a molecularly homogeneous structure prior to melting and to which other ingredients may be added and mechanically mixed.

Another object is to provide a novel method of forming glasses of compositions embodying ingredients such as phosphates or borates, the primary sources of which contain large proportions of water or other volatile materials, whereby the difficulties inherent in forming mechanical mixtures and homogeneous melts are substantially entirely eliminated through the forming of an initial chemical reaction product embodying said ingredients through which substantially all the undesirable volatile ingredients may be segregated from the essential ingredients for the ultimate glass and which may thereafter be melted with or without the addition of other desirable ingredients and free from tendency to liberate injurious or objectionable products.

Other objects and advantages of the invention will become apparent from the following description taken in connection with the accompanying claims and it will be apparent that many changes may be made in the steps of the methods set forth herein as the preferred forms only have been given by way of illustration.

Prior to the present invention it has been a usual procedure in forming glasses to weigh the ingredients of a glass batch and mix to as homogeneous a mechanical mixture as is possible by mechanical means. The individual particles, however, being relatively coarse and retaining their identity, tended to react during the melting operation slowly and only superficially and the products of said melting served as a barrier to further reaction, with the result that in many cases after partial reaction, the first liquid produced seeped to the bottom of the mass. This had two objectionable results, first, the liquid that seeped to the bottom was still very reactive and tended to attack the container. The material remaining on top, and less reactive due to its granular nature, tended to remain in that condition as the more reactive portion of the melt seeped to the bottom. The result was that it is a common occurrence for certain desirable batch constituents to float on the top as a scum which must be skimmed off or the melting process modified, or otherwise undesirable constituents added to reduce this segregation or melting as much as possible. In addition, certain glass compositions tend to form immiscible liquid layers and the formation from such compositions of homogeneous glass is almost impossible and requires special undesired precautions as to stirring temperatures, times, etc.

The present invention overcomes the above difficulties by means of the intimate essentially molecular combination of the essential ingredients whereby the chemical reactions have already taken place prior to the melting and a consolidation and uniting of the substantially homogeneous particles is all that is necessary in the melting operation.

Stirring is not necessary because of the already intimate mixture of the composition, the melting is remarkably rapid, and the expensive operation known as "fining," that is, the holding at top temperatures to render the glass fluid and thereby drive out dissolved gases or complete bubble forming reactions, is unnecessary.

In the case of glasses which have as their raw materials hygroscopic or highly reactive or corrosive compounds whose effect is to render difficult, inconvenient or dangerous the mechanical mixing and handling of the batch prior to melting, such raw materials may be combined chemically with other ingredients to form dry, inert, readily handled batch materials substantially free from all the above defects.

It is recognized that two or more of the ingredients of some prior art glass melts might have been added in a form in which they were chemically combined either by geological processes or by chemical manufacturing operations, but such ingredients added as chemical entities in most instances in the past were added primarily because they were more readily or commercially available in a chemically combined state, but in general such compounds when melted in the batch still gave off volatile products and did not solve the problem of the present invention, and as far as is known, no molecular mixture of chemically combined ingredients has ever been prepared to produce a glass with the thought in mind of obviating the difficulties resulting from carrying on chemical reactions at temperatures required for glass melting, with consequent undesirable volatilization, refractory attack, segregation, and lack of homogeneity in the form of bubbles, striae and the like.

In following the teachings of the present invention the general method employed is to combine the elements which under usual mechanical mixing are known to introduce the various difficulties set forth above by forming a chemical combination of said essential ingredients in a volatile solvent, such as water, at relatively low temperatures compared to the ordinary glass melting temperatures. Thereby the undesirable reactions which at the elevated temperatures would produce trouble are carried to completion in the solution. Volatile constituents which it may be desired to retain in the glass will combine chemically into relatively stable compounds and other volatile compounds which it is undesirable to have present during the melting are liberated and easily disposed of and eliminated. For example, chlorine, carbon dioxide, water vapor, sulphur compounds and the like are readily removed from the aqueous solution or suspension, whereas the viscous glass melt normally resulting from usual glass batches traps such volatile compounds when liberated by nonaqueous reactions at elevated temperatures, forming bubbles and other defects.

*Example 1.*—For example, let us assume that we are to make the following glass whose chemical analysis would be expressed substantially as follows:

| | Parts by weight |
|---|---|
| $P_2O_5$ (phosphoric anhydride) | 70 |
| $Al_2O_3$ (aluminum oxide) | 15 |
| BaO (barium oxide) | 5 |
| $Na_2O$ (sodium oxide) | 10 |

In accordance with the prior art the batch would probably consist of:

| | Parts by weight |
|---|---|
| 75% $H_3PO_4$ (orthophosphoric acid) | 1290 |
| $Al(OH)_3$ (hydrated alumina) | 229 |
| $BaCO_3$ (barium carbonate) | 64½ |
| $Na_2CO_3$ (sodium carbonate) | 171 |

Mechanical mixing only of these compounds before melting results during melting in the liberation of large quantities of water and carbon dioxide with foaming, and loss of phosphoric anhydride, together with a considerable amount of refractory attack. Thermal shock upon the refractory is intense. Fumes of phosphoric anhydride are given off, which are a health and corrosion hazard, and the melting operation, in spite of all precautions, is unsatisfactory.

The process of the present invention is as follows:

The $H_3PO_4$ (phosphoric acid) in any convenient container and suitably diluted has added to it a calculated quantity of an aluminum compound, such as the hydrate, $Al(OH)_3$. Then or simultaneously there is added to it a calculated quantity of a barium compound which reacts with phosphoric acid, and a sodium compound which will react with phosphoric acid. The chemical mixture of aluminum phosphate, barium phosphate and sodium phosphate resulting from the reactions of the phosphoric acid with the added ingredients is concentrated by evaporation, if necessary, filtered, washed and dried. The resulting product then serves as the batch which is to be melted. It may be fed into the glass melting container with or without cullet. Cullet is used ordinarily to minimize pot attack and accelerate melting, but the sole reason for adding cullet in the present invention would be, as a matter of economy, to furnish an outlet for scrap resulting from subsequent operations and is in any case not essential for satisfactory melting. During the melting operation, as the reactions have been already completed, no consideration has to be given to avoiding frothing and bubble formation or scum formation, and in addition lower temperatures may be used because it is not necessary to raise the temperature excessively to accelerate chemical reactions.

The glass produced in accordance with the present invention has substantially the composition of the charged batch, but it is to be understood that other desirable ingredients which will not bring about undesirable volatilization losses, segregations, etc., might be added, as for example, coloring or absorptive ingredients, such as cobalt, iron, cerium, etc. Other minor or modifying ingredients, such as supplementary alkalis and alkaline earths may be added to secure specific physical properties in the final product, even though such ingredients might introduce minor amounts of volatiles. Of course, it is understood that these modifying ingredients may be incorporated in the original chemical reaction in order to obtain the full benefits of the present teachings, but there are definite advantages to having a large stock pile of colorless base batch of simple composition available for preparing as needed small lots of colored glasses or glasses with very specific physical properties.

It is particularly pointed out that substantially complete chemical reaction takes place during the initial chemical combining of the ingredients, so that during the actual melting substantially no further chemical reaction occurs.

Chemical combining of the various ingredients of the present invention is not the mere mixing and dehydration of the ingredients, but is the actual chemical reaction of these ingredients to form compounds which probably possess sensibly the same atomic distributions as those which will be present in the final glass.

It is further pointed out that any two or more of the ingredients of the batch may be reacted chemically to provide a convenient material for use as the major constituent of the batch, but in general the purpose of the present invention is to include in the chemical reaction specifically those constituents which cause trouble in the actual melting operation.

For instance, in the example given above, the major difficulty in producing such a glass by the prior art methods arises from the high volatility of $P_2O_5$ in the presence of water. This can be overcome by introducing the $P_2O_5$ in the form of anhydrous phosphate salts of sodium, barium, and/or aluminum, but certain difficulties here arise:

(1) Unless metaphosphate or higher polyphosphates are used, additional $P_2O_5$ must be added from a hygroscopic or hydrated source. Excessive loss results of $P_2O_5$ by volatilization during melting.
(2) If a sodium salt is chosen to fix the phosphate, it melts first. This initial liquid phase is highly fluid and attacks the refractory badly. It may react so slowly with the barium and aluminum sources that they segregate. The fixing of the $P_2O_5$ is not strong enough, as evidenced by copious fumes from a melt of this type.
(3) A barium phosphate is better than sodium in the above respects, but since BaO is a relatively minor constituent of the glass, a large enough proportion of fixed phosphate cannot be introduced by fixing $P_2O_5$ with BaO.
(4) Aluminum phosphates have been found to be a highly efficient means of fixing $P_2O_5$, suffering least from the drawbacks given under (2) above. On account of the high proportion of $P_2O_5$ called for in glasses of the type given in Example 1, the metaphosphate or a higher salt must be used. Even then the sodium and/or barium must also be added as fixed phosphates to maintain the $P_2O_5$ level. These would melt first and segregation and pot attack can take place before all of the aluminum phosphate dissolves.

Therefore, I prefer to chemically react primarily all of the essential trouble producing ingredients of the glass in the aqueous chemical reaction step, so that they are in intimate molecular mixture before they are introduced into the melting furnace with or without other ingredients.

*Example 2.*—Let us assume that we are to form an aluminophosphate glass containing silica as a relatively minor but valuable ingredient. The prior art procedure would be to mechanically mix granular silica with the other essential ingredients and place the mixture into a refractory container for the melting operation. All the other ingredients except the silica, such as phosphoric anhydride and aluminum oxide and alkali, first react to form the initial liquid. The silica, having a lower specific gravity than this liquid, floats to the surface of it and reacts slowly and incompletely. This causes a scum to be present which has to be skimmed off and the final glass, therefore, does not have the silica content desired. By following the teachings of the present invention this formation of a scum and loss of silica content is obviated because the silica is dissolved by the phosphoric acid solution during the aqueous chemical reaction and an intimate molecular mixture of all the constituents is formed. In the actual melting operation these merely fuse down to a liquid without further chemical reaction and without appreciable loss of any of the desired ingredients.

*Example 3.*—Other glasses to which the present teachings apply are those consisting primarily of zinc borate or cadmium borate stabilized with aluminum compounds, beryllium compounds, or mixtures of aluminum and beryllium compounds. Such glasses as ordinarily prepared by the prior art, using mechanical mixing of the constituents and subsequent melting to complete the mechanical combination, are extremely corrosive and require special containers for melting. In addition, the stabilizing compounds such as aluminum and beryllium compounds dissolve so slowly in the initial liquid phase that prolonged heating and excessive temperatures are necessary, thorough and continuous stirring is essential, and both of these operations increase refractory attack.

The production by chemical means of already chemically combined zinc borate plus aluminum and/or beryllium compounds renders the melting more rapid and at a lower temperature, and virtually eliminates the attack on the container because the viscosity at melting is greater, which permits less penetration into the pores of the container, and the chemical reaction, having already taken place, has resulted in a compound having less affinity for the pot materials.

It is to be understood that with all of the above chemical mixtures the proportions of the ingredients which are to react chemically are carefully proportioned and selected so that the resultant ingredients are of the desired proportions to produce the resultant glass composition. For example, in a glass whose analysis is expressed substantially as

| | Parts by weight |
|---|---|
| ZnO (zinc oxide) | 60 |
| $B_2O_3$ (boric oxide) | 34 |
| $Al_2O_3$ (alumina) | 5 |
| BeO (beryllia) | 1 |

It is desirable to combine in the chemical mix

| | Parts by weight |
|---|---|
| ZnO (zinc oxide) | 600 |
| $H_3BO_3$ (boric acid) | 604 |
| $Al(OH)_3$ (alumina hydrate) | 76½ |
| $BeCO_3$ (beryllium carbonate) | 29 | with sufficient additional water to bring about complete reaction.

With the above mixture, the water and the $CO_2$ are driven off and the remaining ingredients are in a very intimate combination so that the melting process proceeds very smoothly and rapidly. The ingredients resulting from the chemical mix are in proportions which correspond to those desired in the final glass to obtain the desired physical properties and which produce the chemical analysis as expressed in the original glass.

However, it may also be desirable to react only the aluminum and beryllium sources with the boric acid in the aqueous step and then make up the batch by mechanically mixing the resulting powder with zinc oxide. In this way the slowly soluble, segregating constituents would be in intimate combination with $B_2O_3$ (boric oxide) which is the first melting ingredient and solvent, and since zinc oxide introduces no undesirable volatiles or low melting corrosive liquid its combination with the chemically reacted portion of the batch might proceed sufficiently smoothly, rapidly, and without difficulties.

*Example 4.*—Let us assume that it is desired to produce a fluoride resisting glass whose analysis is expressed substantially as

| | Parts by weight |
|---|---|
| $P_2O_5$ | 72 |
| $Al_2O_3$ | 18 |
| ZnO | 10 |

Silica reacts with fluoride to form silicon tetrafluoride gas, highly volatile even at room temperature, so that the silica content of such a glass should be kept at an absolute minimum. The most convenient and economical refractories for melting this glass, however, are made out of clay and other silicate minerals and consequently have a high silica content. The zinc oxide in the glass batch of the composition set forth above attacks, when heated, such a silicate refractory when the ingredients are mechanically mixed, and, also, excessive $P_2O_5$ might be lost by volatilization in the presence of water at glass melting temperatures, but by following the teachings of this invention and producing an initial chemical reaction between the zinc oxide, alumina and phosphoric oxide, which in the mechanical mix would be individually troublesome, before the melting operation the attack can be virtually eliminated and volatilization minimized. The glass produced will be substantially free of undesired silica content to such a degree that it is suitable for a container for hydrofluoric acid.

Some of the advantages of the present invention are obtained by chemically reacting the $Al_2O_3$ and $P_2O_5$ and then making up the batch for melting from the resulting aluminum phosphate plus zinc oxide. However, it has been found that at the temperatures (2500 to 2600° F.) required to melt such a batch appreciable attack of the refractory by the free zinc oxide takes place before melting is completed therefore a completely chemically reacted batch is preferred in this particular instance.

It is to be understood that any suitable ingredients may be set forth from which glasses having different desirable characteristics might be formed and with which similar undesirable reactions take place under ordinary mechanical mixing.

Having described my invention, I claim:

1. The process of forming clear homogeneous glasses from a glass batch including ingredients that, when heated, interreact chemically and give off volatile by-products, comprising dissolving said ingredients in a given liquid to form a liquid menstruum, subjecting said liquid menstruum to a temperature below the melting point of said ingredients but one at which said ingredients will inter-react chemically in solution and produce said volatile by-products, separating the chemically reacted ingredients from the by-products and liquid, adding the chemically reacted ingredients to the batch and fusing the batch into the desired product, said fusing being unaccompanied by chemical inter-reaction of the ingredients of the batch and the production of volatile by-products whereby a clear homogeneous product is formed.

2. The process of forming clear homogeneous glasses from a glass batch including ingredients that, when heated, chemically inter-react and produce by crystallization and volatilization by-products that interfere with the melting of the glass batch comprising combining said ingredients with water to form a liquid menstuum, subjecting said menstruum to a temperature below the melting point of said ingredients but one at which said ingredients will chemically inter-react in solution, to produce said by-products, separating the by-products and liquid from the chemically reacted ingredients, adding said chemically reacted ingredients to the batch and fusing said batch into a clear homogeneous glass, said fusing being unaccompanied by chemical inter-reactions, crystallizations and volatilizations.

3. The method of forming a glass composition whose ultimate chemical analysis would be expressed substantially as:

| | Parts by weight |
|---|---|
| $P_2O_5$ (phosphorous anhydride) | 72 |
| $Al_2O_3$ (aluminum oxide) | 18 |
| ZnO (zinc oxide) | 10 | from batch ingredients which when melted together would chemically inter-react and produce volatile by-products comprising initially dissolving said ingredients in water, heating said solution to a temperature below the melting point of the ingredients but one at which said ingredients will chemically inter-react in solution to produce zinc and aluminum phosphates and volatile by-products, separating said zinc and aluminum phosphates from the water and by-products and fusing said aluminum and zinc phosphates into the desired glass composition.

4. The method of forming a glass composition whose ultimate chemical analysis would be expressed substantially as:

| | Parts by weight |
|---|---|
| $P_2O_5$ (phosphorous anhydride) | 70 |
| $Al_2O_3$ (aluminum oxide) | 15 |
| BaO (barium oxide) | 5 |
| $Na_2O$ (sodium oxide) | 10 | from batch ingredients which when melted together would chemically inter-react and produce volatile by-products comprising initially dissolving said ingredients in water, heating said solution to a temperature below the melting point of the ingredients but one at which said ingredients will chemically inter-react in solution to produce aluminum, barium and sodium phosphates and volatile by-products, separating said phosphates from the water and by-products and fusing said phosphates into the desired glass composition.

5. The process of forming a glass composition whose chemical analysis would be substantially as follows:

| | Parts by weight |
|---|---|
| Phosphorous anhydride | 70 |
| Aluminum oxide | 15 |
| Barium oxide | 5 |
| Sodium oxide | 10 | from a glass batch consisting of:

| | Parts by weight |
|---|---|
| Orthophosphoric acid | 1290 |
| Hydrated alumina | 229 |
| Barium carbonate | 64½ |
| Sodium carbonate | 171 | comprising dissolving said batch ingredients in water, heating said solution to a temperature below the point at which said ingredients would melt but one at which said ingredients will chemically inter-react to produce phosphates and volatile by-products, separating the by-products and water from the phosphates, and fusing said phosphates into a clear homogeneous glass having said chemical analysis.

HAROLD R. MOULTON.

REFERENCES CITED

The following references are of record in the file of this patent:

UNITED STATES PATENTS

| Number | Name | Date |
|---|---|---|
| 2,065,502 | Bausch | Dec. 29, 1936 |
| 2,241,249 | Eberlin et al. | May 6, 1941 |
| 339,525 | Burgess et al. | Apr. 6, 1886 |
| 1,933,739 | Kraver | Nov. 7, 1933 |
| 2,215,209 | Cornetts | Sept. 17, 1940 |
| 295,410 | Knaffl | Mar. 18, 1884 |
| 2,326,059 | Nordberg | Aug. 3, 1943 |
| 1,736,642 | Beandry | Nov. 19, 1929 |

FOREIGN PATENTS

| Number | Country | Date |
|---|---|---|
| 7,281 | Great Britain | Aug. 3, 1943 |
| 360,342 | Germany | 1922 |